US008601502B2

(12) United States Patent
Higgins et al.

(10) Patent No.: US 8,601,502 B2
(45) Date of Patent: Dec. 3, 2013

(54) APPARATUS, SYSTEM AND METHOD FOR DELIVERING POLLING AND USER GENERATED CONTENT TO DISPARATE COMMUNICATION

(75) Inventors: Scott Sanders Higgins, Cherry Hills Village, CO (US); Michael Louis Goldstein, Denver, CO (US)

(73) Assignee: DISH Network L.L.C., Englewood, CO (US)

( * ) Notice: Subject to any disclaimer, the term of this patent is extended or adjusted under 35 U.S.C. 154(b) by 802 days.

(21) Appl. No.: 11/936,537

(22) Filed: Nov. 7, 2007

(65) Prior Publication Data

US 2009/0119693 A1 May 7, 2009

(51) Int. Cl.
*H04H 60/33* (2008.01)
*G06F 17/30* (2006.01)
*G06F 3/01* (2006.01)

(52) U.S. Cl.
USPC .................. 725/9; 725/13; 725/16; 715/201; 715/751

(58) Field of Classification Search
USPC .......... 725/9, 13, 16, 37, 109, 110, 114, 115; 715/200, 201, 751
See application file for complete search history.

(56) References Cited

U.S. PATENT DOCUMENTS 6,718,551 B1 4/2004 Swix
6,822,663 B2 * 11/2004 Wang et al. .................. 715/854
6,978,470 B2 12/2005 Swix
7,243,362 B2 7/2007 Swix
2002/0124247 A1 9/2002 Houghton
2003/0145331 A1 7/2003 Escobar et al.
2008/0086742 A1 * 4/2008 Aldrey et al. .................. 725/24
2008/0086750 A1 * 4/2008 Yasrebi et al. .................. 725/86
2009/0007178 A1 * 1/2009 Artom .......................... 725/40

FOREIGN PATENT DOCUMENTS

WO WO 2007/103655 A 9/2007
WO WO 2007103655 A2 * 9/2007 ............ H04N 11/02

OTHER PUBLICATIONS

International Search Report for PCT application PCT/US2008/082221, mailed on Jul. 29, 2009.
Sumo.tv—Are We Putting You on? A Video Sharing Community. Nov. 14, 2007. United Kingdom.
China Intellectual Property Office, "Office Action" mailed Apr. 5, 2012; Appln. No. 097140688.

* cited by examiner

*Primary Examiner* — Vivek Srivastava
*Assistant Examiner* — Jason Thomas
(74) *Attorney, Agent, or Firm* — Ingrassia Fisher & Lorenz, P.C.

(57) ABSTRACT

Various embodiments of apparatus, systems and/or methods are described for providing user generated content relating to a subject, and collecting polling data relating to the subject, on multiple disparate communication devices. User generated content is received from one or more disparate communication devices and provided for presentation on at least one of the communication devices. Polling data is also received from at least one of the end-users of the communication devices viewing the user generated content, and tabulated to generate poll results displayable on the communication devices.

2 Claims, 12 Drawing Sheets

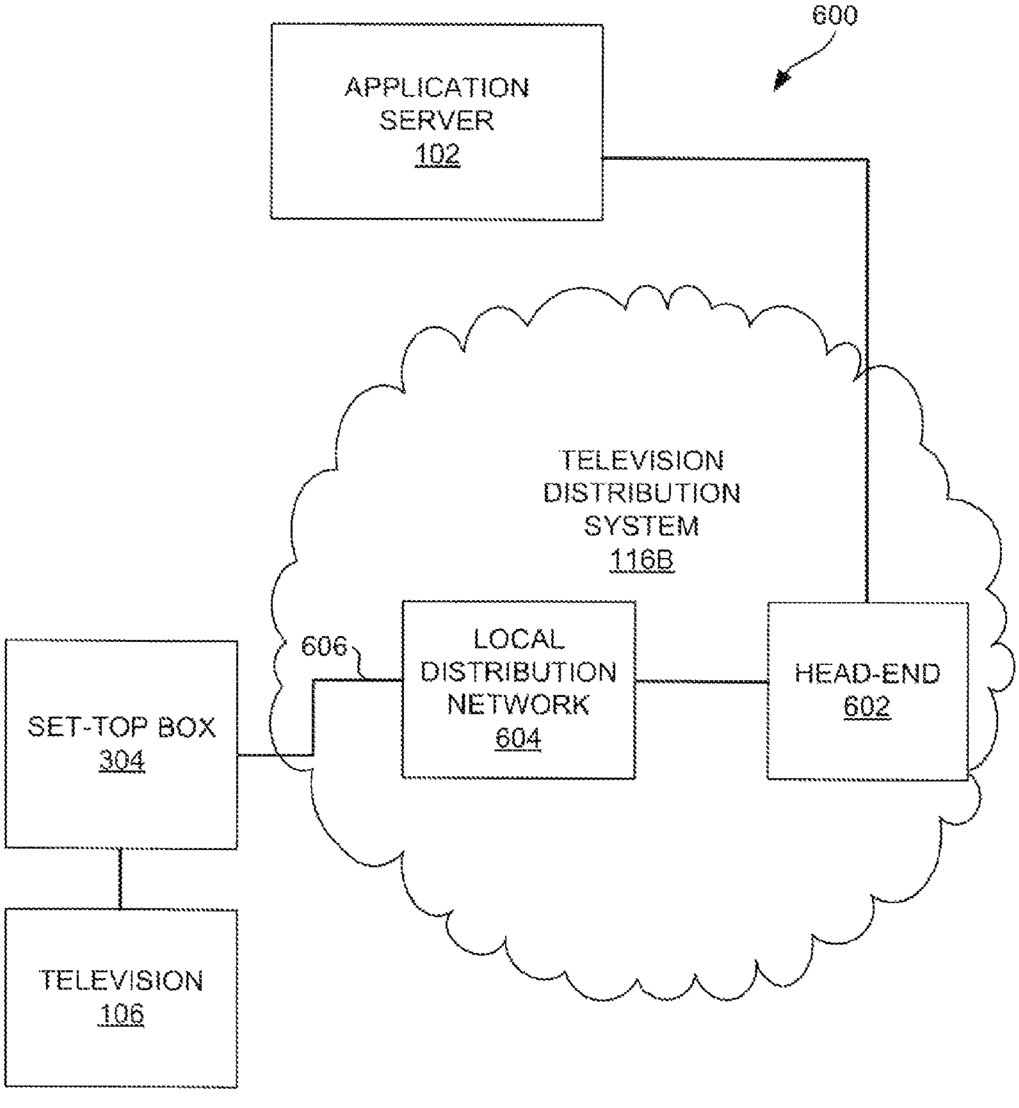
FIG. 6
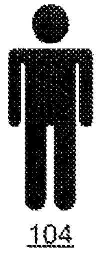

APPARATUS, SYSTEM AND METHOD FOR DELIVERING POLLING AND USER GENERATED CONTENT TO DISPARATE COMMUNICATION

BACKGROUND

User generated content has become a popular form of media expression in society. In the past, most media content was generated by large entities and presented to consumers using tightly controlled mediums. For example, during government elections, television stations, radio stations and newspapers controlled who was allowed to express their opinions on candidates and issues, and when these people were allowed to speak. Because television, radio and newspapers were the predominant form of mass communication, it was very difficult for many individuals to mass communicate their opinions regarding the election process. The internet has in some ways allowed many individuals to express their opinion regarding the election process (as well as other subjects), in the form of user generated content, such as videos and blogs available on many web sites. While user generated content has become quite popular on the internet, television and radio still haven't embraced the concept of user generated content, and the major broadcast mediums remain largely inaccessible to most people.

BRIEF DESCRIPTION OF THE DRAWINGS

The same number represents the same element or same type of element in all drawings.

FIG. 6 illustrates an embodiment of a cable television distribution system.

DETAILED DESCRIPTION

The various embodiments described herein generally provide apparatus, systems and methods which facilitate the reception, processing, outputting and communication of content from one or more sources, via one or more communications mediums (or networks), to one or more communication devices for presentation to one or more end-users. In short, the various embodiments described herein provide multi-platform content communications apparatus, system and/or methods.

In at least one embodiment, the content to be received, processed, outputted and/or communicated may come in any of various forms including, but not limited to, audio, video, data, information, or otherwise. As used herein, "content" refers to information communicated via a media (e.g., on a web page or otherwise) without concern as to the design, placement or layout of the information on the media. Further, as used herein, "user generated content" generally refers to various kinds of content produced by end-users (e.g., television viewers), as opposed to traditional media producers such as professional writers, publishers, journalists, licensed broadcasters and production companies. By contrast, as used herein, "media content" generally refers to content produced by the traditional media producers rather than end-users. It is to be appreciated, however, that "content," regardless of whether "user generated", "media content" or otherwise, includes videos, video clips, photographs, sound recordings, text files, graphical images and the like.

In one embodiment discussed herein, the communicated content is described in the context of a government election (e.g., a presidential or congressional election). However, it is also to be appreciated that apparatus, systems and/or methods described herein (and/or extensions and/or adaptations thereof) may be operable to provide content regarding any subject, including music, movies, sports, and the like. The apparatus, systems and methods described herein can also be configured, in other embodiments, to provide polling and other functions regarding the communicated content, the subject of the content and the like.

Figure 1:
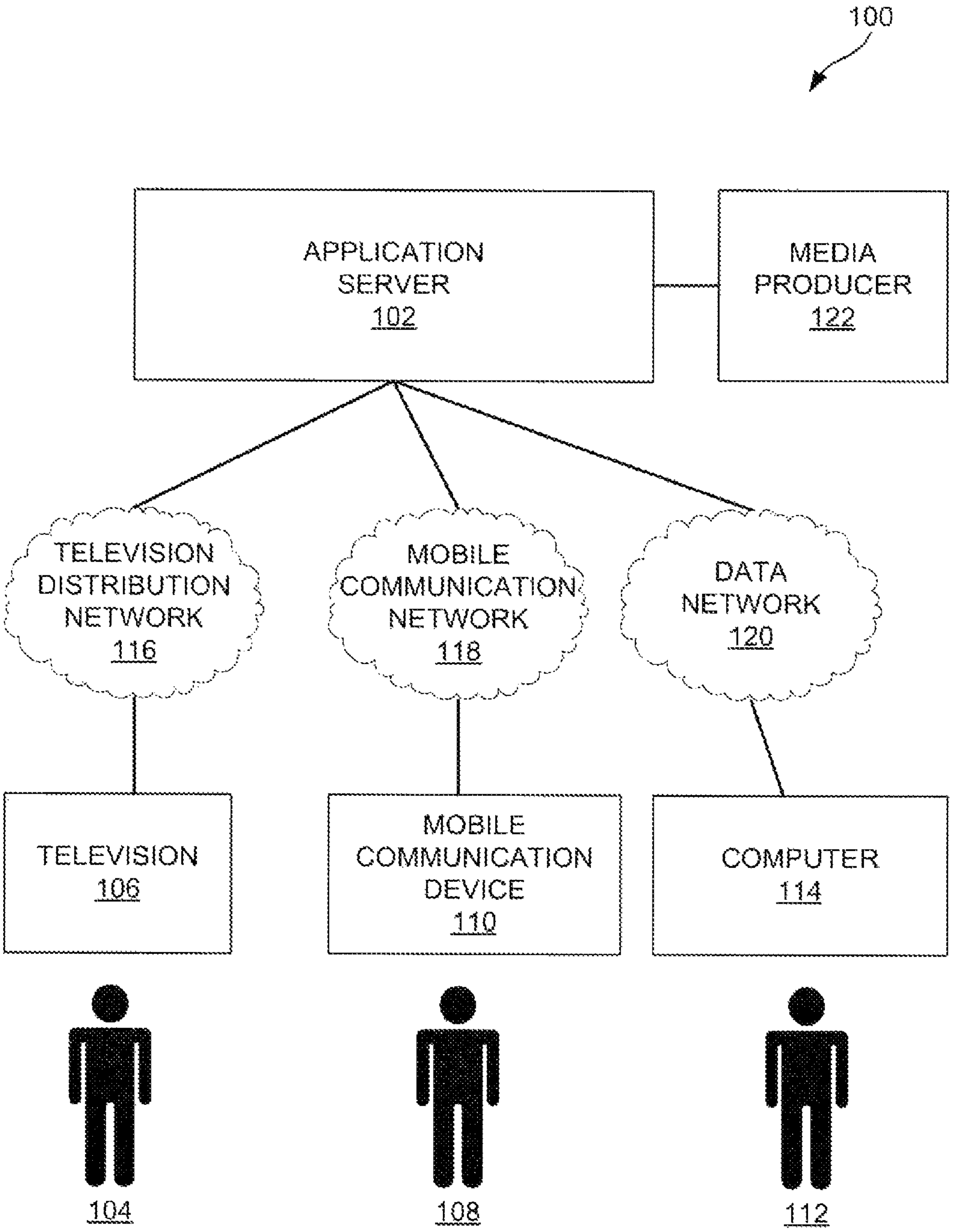
FIG. 1 illustrates an embodiment of a content system that provides content relating to a subject.

FIG. 1 illustrates an embodiment of a content system 100 that provides content relating to a subject (e.g., an election). In this embodiment, the content system 100 is configured to receive, combine, output and communicate content to end-users. None, some or all of the content communicated to end-users can be "user generated content" or information based thereon. Further, none, some or all of the content can be "media content" or information based thereon. Content system 100 may be adapted to combine media content and user-generated content in many different presentation formats in many different combinations depending on various factors, including user preferences, presentation capabilities of end-user devices, content restrictions and the like.

As shown, content system 100 includes an application server 102 which is in communication with one or more end-users 104, 108 and 112, via one or more communication networks 116, 118 and 120, and one or more communications devices 106, 110 and 114. Application server 102 is further in communication with one or more media producers 122. Each of these components is discussed in greater detail below.

In content system 100, each user 104, 108 and 112 desirably utilizes one or more communication devices 106, 110 and 114 to receive from and/or communicate content to the application server 102. Examples of communication devices include, but are not limited to, televisions, computers, personal digital assistants (PDAs), other computing devices, and/or mobile communication devices (e.g., mobile or wireless telephones). Communication devices 106, 110 and 114 may provide for receive capability only (e.g., televisions and stereo systems), receive and transmit capabilities (e.g., wireless telephones, wired telephones, computers, two-way radios, and WiFi PDAs), or transmission only capabilities (e.g., video or still cameras and audio recording devices).

Communication devices may be combined, as desired, to provide any combination of receive and/or transmit communication capabilities.

Content system 100 also includes one or more communication networks 116, 118 and 120. These networks may utilize any desired combination of wired (e.g., cable and fiber) and/or wireless (e.g., cellular, wireless, satellite, microwave, and radio frequency) communication mediums and any desired network topology (or topologies when multiple mediums are utilized). Further, any given user 104, 108 and 112 may utilize one or more communication networks to receive and/or transmit content by and between the application server 102. Exemplary communication networks include television distribution networks (e.g., satellite and cable television networks), wireless communication networks, public switched telephone networks (PSTN), and local area networks (LAN) or wide area networks (WAN) providing data communication services.

Application server 102 is operable for receiving, generating and communicating content by and between one or more of communication devices 106, 110 and 114. In at least one embodiment, application server 102 is operable for receiving various forms and types of user generated content such as polling data, user generated and/or provided videos, demographic data, user preferences, user opinions, statistical data, and the like. In at least one embodiment, application server 102 is also operable for receiving media content from one or more media producers 122, such as news and data feeds, television programs, and the like. It is to be appreciated that the application server 102 may receive practically any form and/or type of information from one or more sources including, for example, users 104, 108 and/or 112 or media producer 122.

Application server 102 is also desirably operable to generate output data automatically, semi-automatically or manually (e.g., based upon user input or direction). Examples of such generated data may include received information, calculated information (e.g., polling results, user videos, user opinions or the like), other information (e.g., demographic information and user viewing habits) and other data, some or all of which may be combined, correlated, provided as received or otherwise used to generate content of any desired form or function.

Application server 102 is also operable to communicate content to one or more users (e.g., users 104, 108 and 112) via one or more communication networks (e.g., networks 116, 118 and 120). It is to be appreciated that the users receiving the communicated content from the application server 102 can be the same or different than those users providing the information to the application server 102.

More specifically and referring to FIG. 1, application server 102 may be configured to receive information from and/or communicate content to a first or television user 104 using television 106, or to a second or mobile user 108 using mobile communication device 110, or to a third or internet user 112 using computer 114. The information received from and/or communicated to any of users 104, 108 and 112 may comprise user generated content of people (e.g., voters) expressing their opinions about candidates and/or issues, and/or media content relating to the election.

The data received by application server 102 from any of television user 104, mobile user 108 and internet user 112 may also include polling data. Further, the application server 102 can be configured to tabulate the polling data in order to generate poll results for presentation to end-users via television 106, mobile communication device 110 and/or computer 114.

The format of the content presented on television 106, mobile communication device 110 and/or computer 114 may differ depending on the presentation capabilities of each device. For example, television 106 and/or computer 114 can be configured to receive standard definition and/or high definition video from application server 102, while mobile communication device 110 may receive reduced resolution video from application server 102. Alternatively, mobile communication device 110 may be operable to display text data (e.g., polling results data) received from application server 102, but may not have the display capabilities for any type of video data or image data. By further example, television 106 and computer 114 may present user generated videos and polling results to users, while mobile communication device 110 may present the polling results but may not display the video data. Further, television 106, mobile communication device 110 and/or computer 114 may not each display the same portion of content provided by application server 102. For example, application server 102 may provide full access to user provided content by computer user 112 on computer 114 through a web site, and may provide a subset of user provided content to television user 104 on television 106. The selection process of content presented to television 106 may be performed based on desired design criteria, such as time limits imposed on television programming, bandwidth capabilities of television distribution network 116, or storage limitations of a set-top box associated with the television 106.

Television 106 may comprise any type of display device operable for receiving and displaying analog and/or digital video signals. Television 106 refers to a television set or video display that may contain an integrated television converter device (e.g., an internal cable-ready television tuner housed inside a television), or, alternatively, that is connected to an external television converter device for receiving and demodulating analog and/or digital signals for presentation on television 106 (e.g., such as a set-top box).

Using an integrated television converted device, television 106 may be operable to communicate directly with television distribution network 116. For example television distribution network 116 may comprise an over-air distribution system (e.g., free television), and television 106 may receive television broadcast signals using an internal or external antenna. Television distribution network 116 may also comprise a cable television distribution system, and television 106 may comprise a cable ready television adapted to receive and demodulate analog or digital cable television signals for presentation to television user 104. In at least one embodiment, television 106 may communicate with television distribution network 116 through an intermediate device, such as a set-top box.

Content system 100 may include other elements or components not illustrated for the sake of brevity. It is also to be appreciated that television distribution network 116, mobile communication network 118 and/or data network 120 may be combined to distribute content to multiple communication devices using the same or various distribution networks. For example, television distribution network 116, mobile communication network 118 and data network 120 may include an internet network, and video data and other content may be provided to television 106, mobile communication device 110 and/or computer 114 through one or more internet connections.

Figure 2:
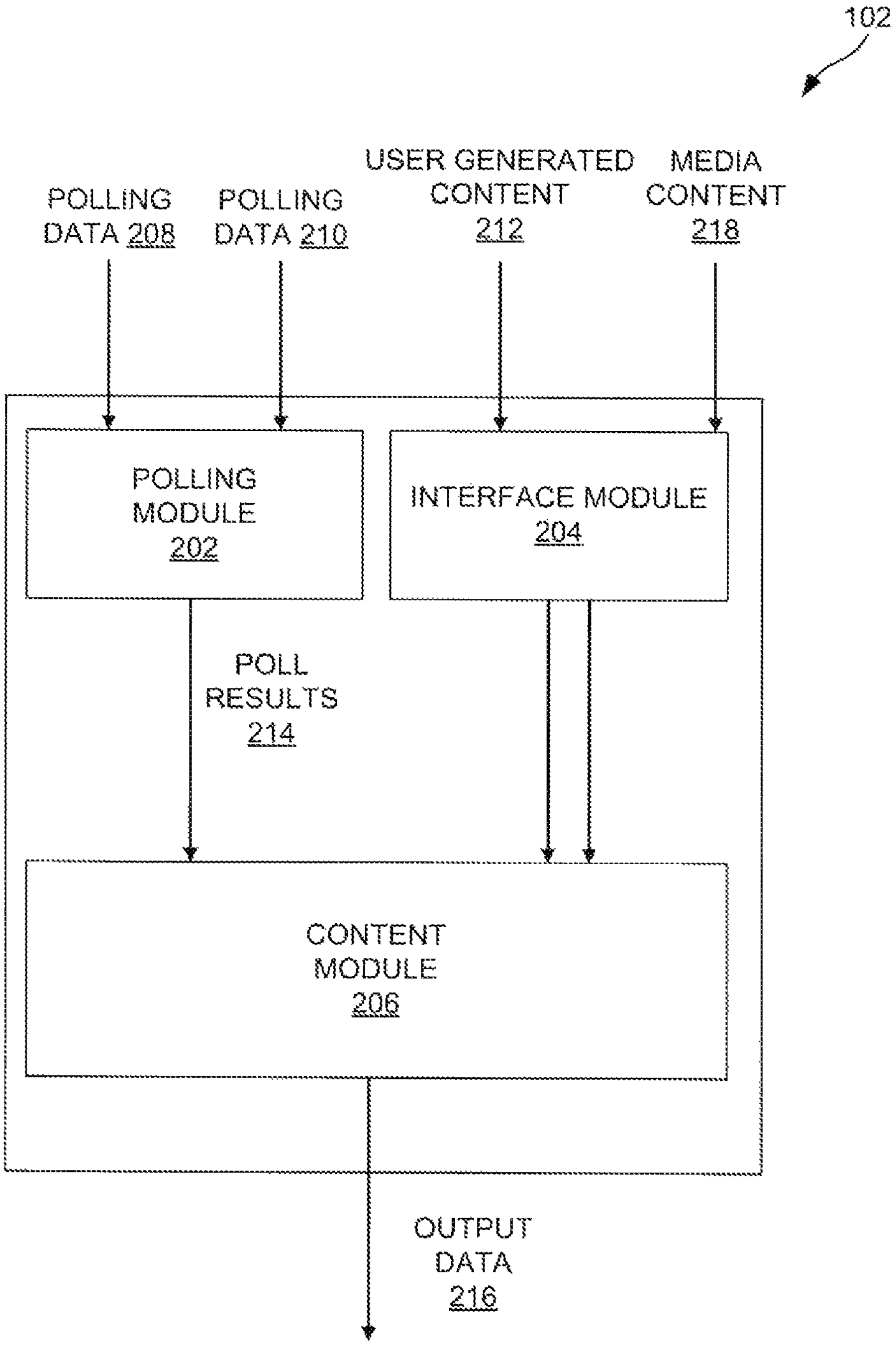
FIG. 2 illustrates one embodiment of functional components of an application server of FIG. 1.

FIG. 2 illustrates one embodiment of functional components of application server 102 of FIG. 1. FIG. 2 will be discussed in reference to content system 100 illustrated in FIG. 1. Application server 102 comprises a polling module 202 operable for providing a poll regarding a subject, and operable for receiving polling data 208 and 210 from television user 104, mobile user 108 and/or computer user 112 responsive to the poll. For example, the subject may comprise an election, and the poll may elicit information regarding the election, such as opinions about a candidate in the election or particular issues of relevance to the election (e.g., taxes). Television distribution network 116, mobile communication network 118 and data network 120 may be in signal communication with polling module 202 to transmit polling data 208 and 210 on behalf of television 106, mobile communication device 110 and computer 114. Polling module 202 may comprise any type of system for receiving input data from one or more communication devices, such as a web server. Polling module 202 is further operable to tabulate polling data 208 and 210 to generate poll results 214.

Application server 102 also comprises interface module 204 operable for receiving user generated content 212 from television user 104, mobile user 108 and/or computer user 112. Interface module 204 may comprise a web server or any other type of interface for receiving video and other data uploads and transmissions from television 106, mobile communication device 110 or computer 114. For example, computer user 112 may upload user generated content 212 as a motion picture experts group (MPEG) video to interface module 204 using a web page provided by interface module 204. Thus, computer user 112 may upload a completed video to interface module 204.

It is also to be appreciated that other techniques may also be utilized to capture user generated content 212. For example, television 106 or mobile communication device 110 may be operable to capture and transmit streaming data to interface module 204 (e.g., using a video camera capturing content in real-time). Television 106 or mobile communication device 110 may also be operable to provide an editing module for television user 104 and mobile user 108 to modify the stream of data transmitted to interface module 204 once the capturing process is complete.

Interface module 204 is further operable to receive media content from media producer 122. Media producer 122 may transmit media content 218 to interface module 204 in the form of a video stream, news or data feed (e.g., election ticker), news articles, and the like. Media producer 122 may embed data within media content 218 identifying which of communication devices 106, 110 and/or 114 are to receive media content 218.

Application server 102 further comprises content module 206 operable to receive poll results 214 from polling module 202, and user generated content 216 and media content 218 from interface module 204, and generates output data 214 for presentation on television 106, mobile communication device 110 and/or computer 114 therefrom. Content module 206 may be operable to generate the output data in multiple formats, each appropriate for presentation on television 106, mobile communication device 110 or computer 114. Thus, each of television 106, mobile communication device 110 or computer 114 may receive a format of the output data 216 for presentation within the capabilities of the device.

Those of ordinary skill in the art will appreciate that the various functional elements 202 through 206 shown as operable within application server 102 may be combined into fewer discrete elements or may be broken up into a larger number of discrete functional elements as a matter of design choice. Thus, the particular functional decomposition suggested by FIG. 2 is intended merely as exemplary of one possible functional decomposition of elements within application server 102.

Figure 3:
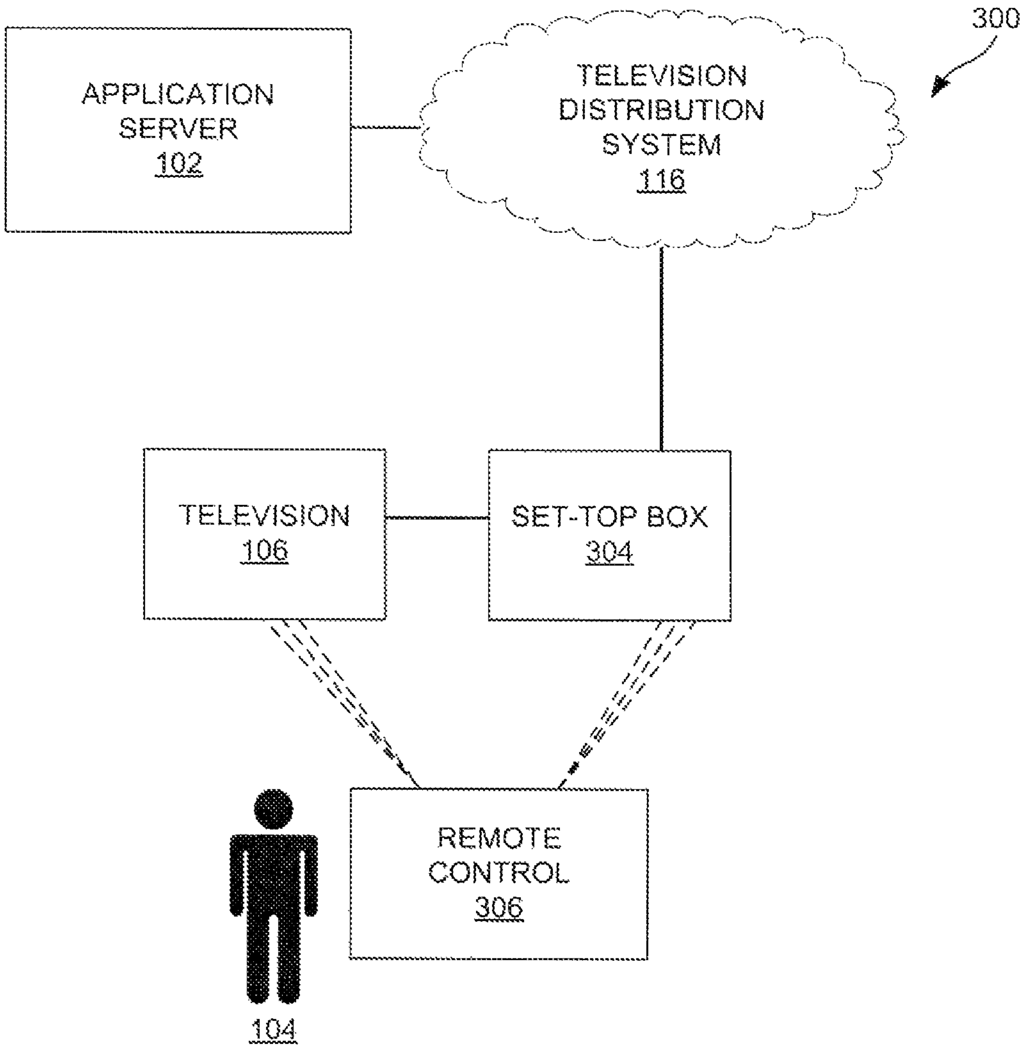
FIG. 3 illustrates one embodiment of a television viewing system.

FIG. 3 illustrates one embodiment of a television viewing system 300. More particularly, FIG. 3 illustrates details of a television 106 utilized in content system 100 of FIG. 1 that receives content through a set-top box 304. Television viewing system 300 will be described in reference to content system 100 illustrated in FIG. 1.

Set-top box 304 may be in signal communication with television 106 using a wired connection (e.g., coax, fiber, composite video connections, high-definition multimedia interface (HDMI)) or wireless connection (e.g., WiFi, Bluetooth). Set-top box 304 is operable for receiving and managing content presented on television 106. Set-top box 304 receives a television broadcast signal or other data signal (e.g., digital video data or other data formatted into a video stream) from television distribution network 116, and provides a video stream for presentation on television 106 generated based on the signal received from television distribution network 116. Television distribution network 116 may comprise a satellite, cable, broadband and/or over-the air television distribution system, and set-top box 304 may communicate with television distribution network 116 through a wired or wireless connection. Television distribution network 116 may distribute television broadcast and other data signals in digital or analog form.

Television viewing system 300 further comprises a remote control 306 operable for remotely operating television 106 and/or set-top box 304. Remote control 306 is operable for controlling the presentation of video and/or other data presented on television 106. Remote control 306 may be further operable to receive input data, such as polling data 208 or 210 (see FIG. 2) from television user 104, and is further operable to provide polling data 208 or 210 to set-top box 304 for transmission to application server 102 (see FIG. 1) through television distribution network 116.

Figure 4:
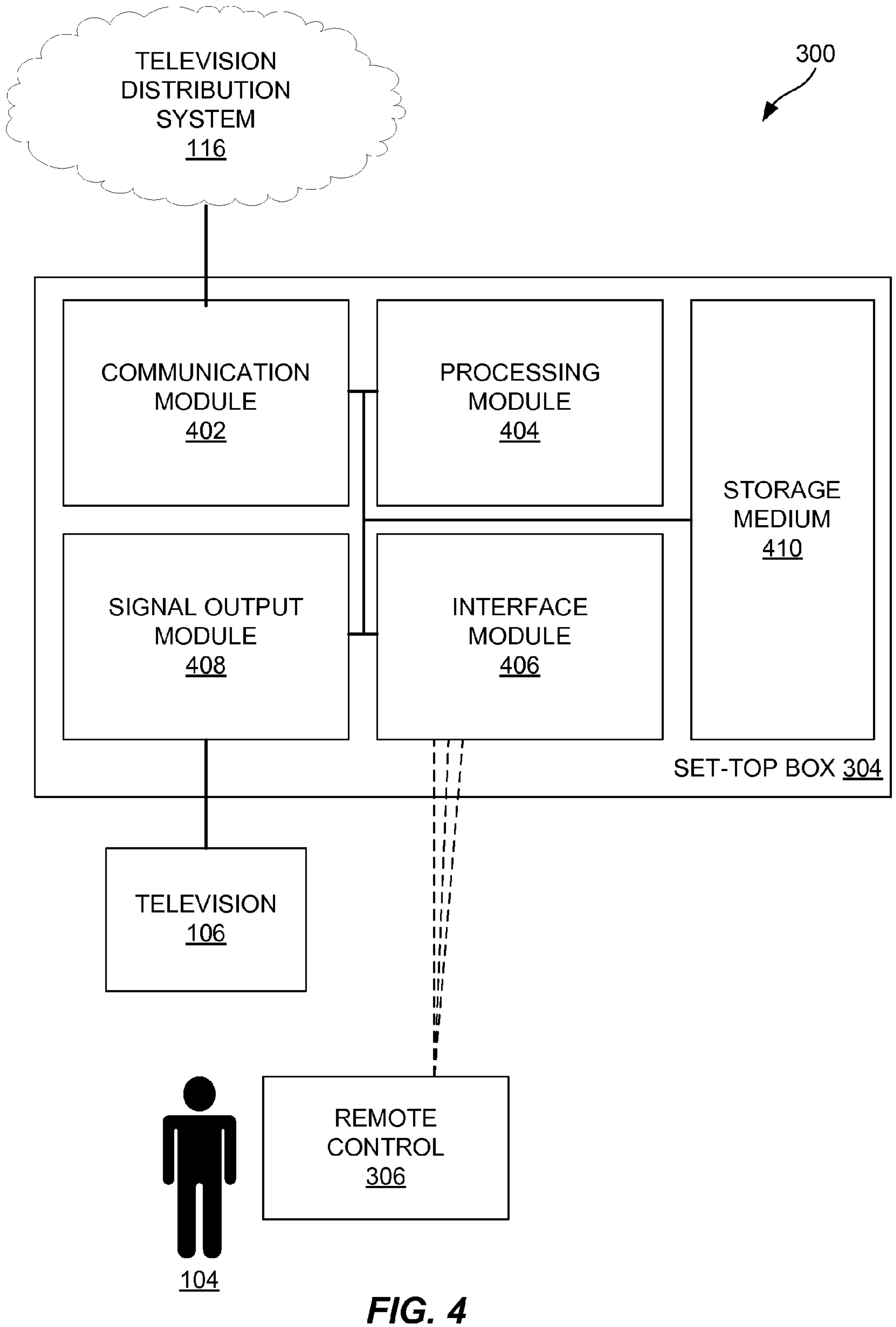
FIG. 4 illustrates one embodiment of the television viewing system of FIG. 3.

FIG. 4 illustrates one embodiment of a television viewing system 300 of FIG. 3. More specifically, FIG. 4 illustrates the functional components of set-top box 304. Set-top box 304 comprises a communication module 402 operable for receiving television broadcast signals and other data signals from television distribution network 116. Communication module 402 may comprise a tuner (not shown) for receiving signals from television distribution network 116. Data received by communication module 402 from television distribution network 116 may include user generated videos, media content relating to a subject (e.g., candidate biographies, election information, etc.), polls, and poll results. Information relating to the subject may be provided to communication module 402 in any form suitable for presentation in a video stream on television 106. Exemplary video formats include MPEG, flash, Windows Media, and the like.

Communication module 402 may be operable for bi-directional communication to transmit data from set-top box 304 to application server 102 through television distribution network 116. For example, communication module 402 may comprise a modem, Ethernet port or other data transfer system for coupling set-top box 304 to application server 102 through a data network, such as a public switched telephone network (PSTN), local area network (LAN) or wide area network (WAN).

Set-top box 304 may include a presentation or processing module 404 operable for processing data signals received by communication module 402 and operable to generate a video stream for presentation on television 106. As used herein, processing module 404 refers to a single processing device or a group of inter-operational processing devices. The operation of processing module 404 may be controlled by instructions executable by processing module 404. Some examples of instructions are software, program code, and firmware.

If necessary, processing module 404 may perform various signal and data processing functions such as demodulation, decoding, decryption and the like on data signals received by communication module 402 to generate an appropriate format video stream for presentation on television 106. Processing module 404 may comprise multiple components, such as a demodulator, an audio decoder, a video decoder, a data decoder or a graphics processor to generate the video stream. The video stream generated by processing module 404 may comprise multiple components including menus, user generated videos, media content relating to a subject (e.g., election information), polls, poll results, and the like.

Set-top box 304 may also include an interface module 406 operable for receiving user input from television user 104. Television user 104 may provide input to interface module 406 using remote control 306. Remote control 306 may comprise an infrared (IR) and/or radio frequency (RF) remote control, wireless or wired keyboard or any type of appropriate input device. Set-top box 304 further comprises signal output module 408 operable to transmit a video stream generated by processing module 404 to television 106. Responsive to receiving the video stream from signal output module 408, television 106 displays video image data to television user 104.

Set-top box 304 may also include internal and/or external storage medium 410 for storing video data files, interactive applications and other content for later presentation to television user 104. Storage medium 410 may provide digital video recorder (DVR) or personal video recorder (PVR) functionality on set-top box 304. For example, set-top box 304 may store user generated videos, information regarding candidates and the election, polls, poll results, and other information, for presentation on television 106 responsive to a request from television user 104 (e.g., when television user 104 selects to view an election channel a television system distribution system). The request from television user 104 may initiate execution of an interactive application operating on set-top box 304, and content presented on television 106 may be determined based on selections made by television user 104 during the operation of the interactive application operating on set-top box 304. In one embodiment, the content presented on television 106 may be determined automatically based on design criteria, such as prior user activity.

Those of ordinary skill in the art will appreciate that the various functional elements 402 through 410 shown as operable within set-top box 304 may be combined into fewer discrete elements or may be broken up into a larger number of discrete functional elements as a matter of design choice. Thus, the particular functional decomposition suggested by FIG. 4 is intended merely as exemplary of one possible functional decomposition of elements within set-top box 304.

Figure 5:
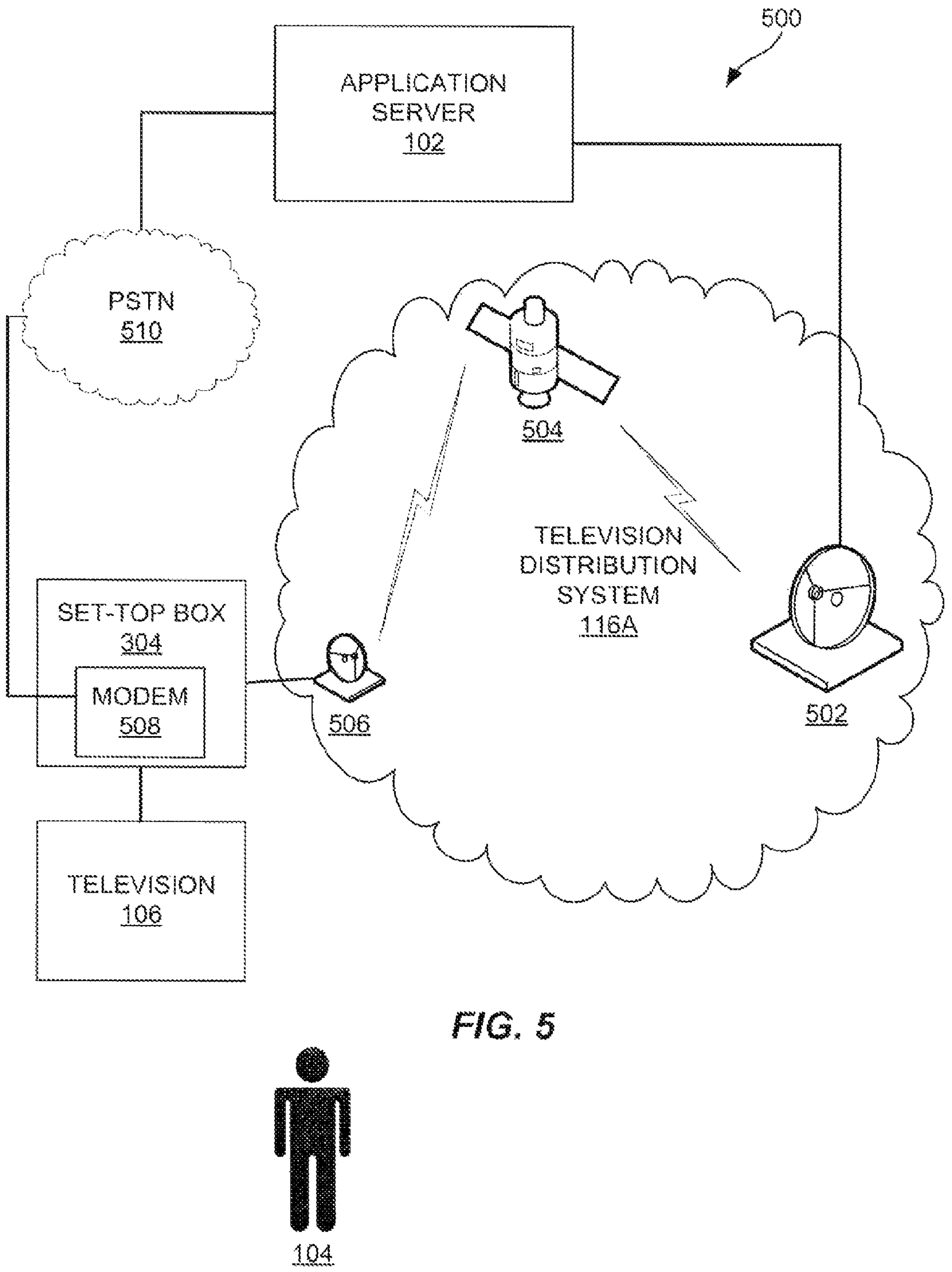
FIG. 5 illustrates an embodiment of a satellite broadcast system.

FIG. 5 illustrates an embodiment of a satellite broadcast system. More particularly, FIG. 5 illustrates details of a television distribution network 116A. Satellite broadcast system 500 will be discussed in reference to content system 100 illustrated FIGS. 1-4.

Satellite broadcast system 500 includes application server 102 in signal communication with uplink system 502 of television distribution network 116A. Application server 102 provides uplink system 502 with a variety of content regarding a subject (e.g., election content) to be transmitted to television 106, including interactive and non-interactive content. Election content may be broadcast by television distribution network 116A, or may be pushed to set-top box 304 responsive to a request by television user 104. Election content may include user generated content, polling data, candidate biographies, election news and/or advertising content. The election content may be embodied as MPEG-2, MPEG-4, analog or baseband signals, and/or other video data of a channel of satellite broadcast system 500.

Satellite broadcast system 500 further comprises satellite 504 in signal communication with uplink system 502. Satellite 504 broadcasts election content received from uplink system 502. Satellite broadcast system 500 further comprises a satellite antenna 506 for receiving the election content broadcast from satellite 504. Satellite antenna 506 is in signal communication with set-top box 304, and provides set-top box 304 with election content. The election content may be broadcast and stored on set-top box 304 periodically, and may be presented on television 106 responsive to television user 104 selecting to view the election channel. Alternatively, the election content may be provided as streaming video to set-top box 304 responsive to television user 104 selecting to view the election channel. If necessary, set-top box 304 decodes the election content, and provides a video stream to television 106 when television user 104 desires to view the election channel. Processing module 404 (see FIG. 4) of set-top box 304 may execute an election application (not shown) for providing interactive television functionality relating to the election content.

Set-top box 304 may be in signal communication with application server 102 through a communications network such as the PSTN 510. The set-top box 304 may comprise a modem 508 in signal communication with PSTN 510 to allow set-top box 304 to transmit data (e.g., polling data) to application server 102. In some embodiments, set-top box 304 may include an Ethernet port or other type of data port in signal communication with other types of data networks to allow set-top box 304 to transmit data to application server 102.

As described above, the election content presented by television 106 may comprise user generated content, polling data, candidate biographies, election news and/or advertising content. Assume that television user 104 desires to view an election channel of satellite broadcast system 500, and selects the appropriate channel on set-top box 304. Responsive to television user 104 selecting the election channel, an election application may launch on set-top box 304. The operation of the election application executing on set-top box 304 will be subsequently described below.

Television distribution network 116 (see FIG. 1) may also be embodied in a cable television distribution system. FIG. 6 illustrates an embodiment of a cable television distribution system 600. More particularly, FIG. 6 illustrates details of a television distribution network 1116B. Cable television distribution system 600 will be discussed in reference to content system 100 illustrated in FIGS. 1-4.

Cable television distribution system 600 comprises a head-end 602 in signal communication with application server 102. Application server 102 provides head-end 602 with a variety of content regarding a subject (e.g., election content) to be transmitted to television 106, including interactive and non-interactive content. Election content may be broadcast by television distribution network 116B, or may be pushed to set-top box 304 responsive to a request by television user 104. Election content may include user generated content, polling data, candidate biographies, election news and/or advertising content.

Cable television distribution system 600 further comprises a local distribution network 604 in signal communication with head-end 602. Local distribution network 604 is operable for receiving content from head-end 602 and distributing the content to individual television display systems 106. Set-top box 304 is in signal communication with local distribution network 604 using a drop 606 from a feeder line of local distribution network 604. Local distribution network 604 may provide content as a broadcast to set-top box 304, or may provide content to a specific addressable set-top box 304 using a broadband connection.

Content system 100 (see FIG. 1) gives voters and candidates a venue to express opinions on both candidates and issues related to an election. Voters may express their opinion by providing user generated content (e.g., videos) to application server 102, or may express their opinion by participating in polls provided over television 106, mobile communication device 110 and/or computer 114.

For example, computer user 112 may utilize computer 114 to visit a web site relating to the election. In at least one embodiment, application server 102 may comprise a web server in signal communication with data network 120 and accessible by computer 114. In at least one embodiment, application server 102 may be in signal communication with an external web server that is accessible to computer 114 through data network 120. The web server may generate a web page or the like to provide the user generated content, the media content and/or the polling results to computer user 114.

Figure 7:
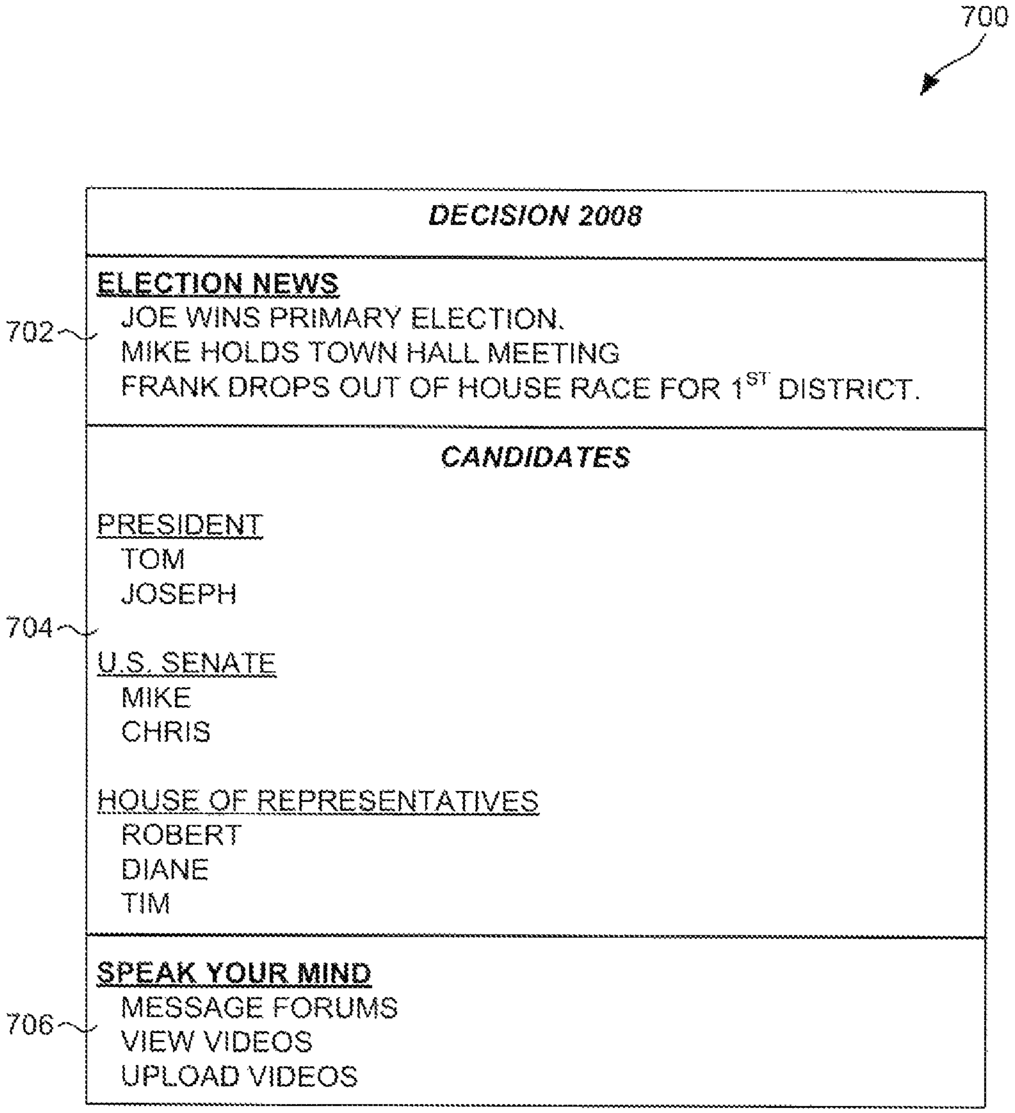
FIG. 7 illustrates a screen shot of a presentation window provided by an application server.

Computer user 112 may upload or transmit user generated content to the web server using computer 114 through a web page form provided by the web server. FIG. 7 illustrates a screen shot of a presentation window 700 provided by application server 102. Presentation window 700 will be discussed in the context of a web page provided to computer user 114. It is to be appreciated that similar formats of content may be presented to television user 104 on television 106, or to mobile user 108 on mobile communication device 110.

As illustrated in FIG. 7, presentation window 700 is a portal that provides election news 702, candidate biographies 704 and speak your mind 706, a venue for voters to provide opinions on a variety of topics. Election news 702 and candidate biographies 704 represent media content relating to a subject (e.g., the election). User generated content (e.g., videos and articles) may be presented to computer user 112 in association with the media content.

Figure 8:
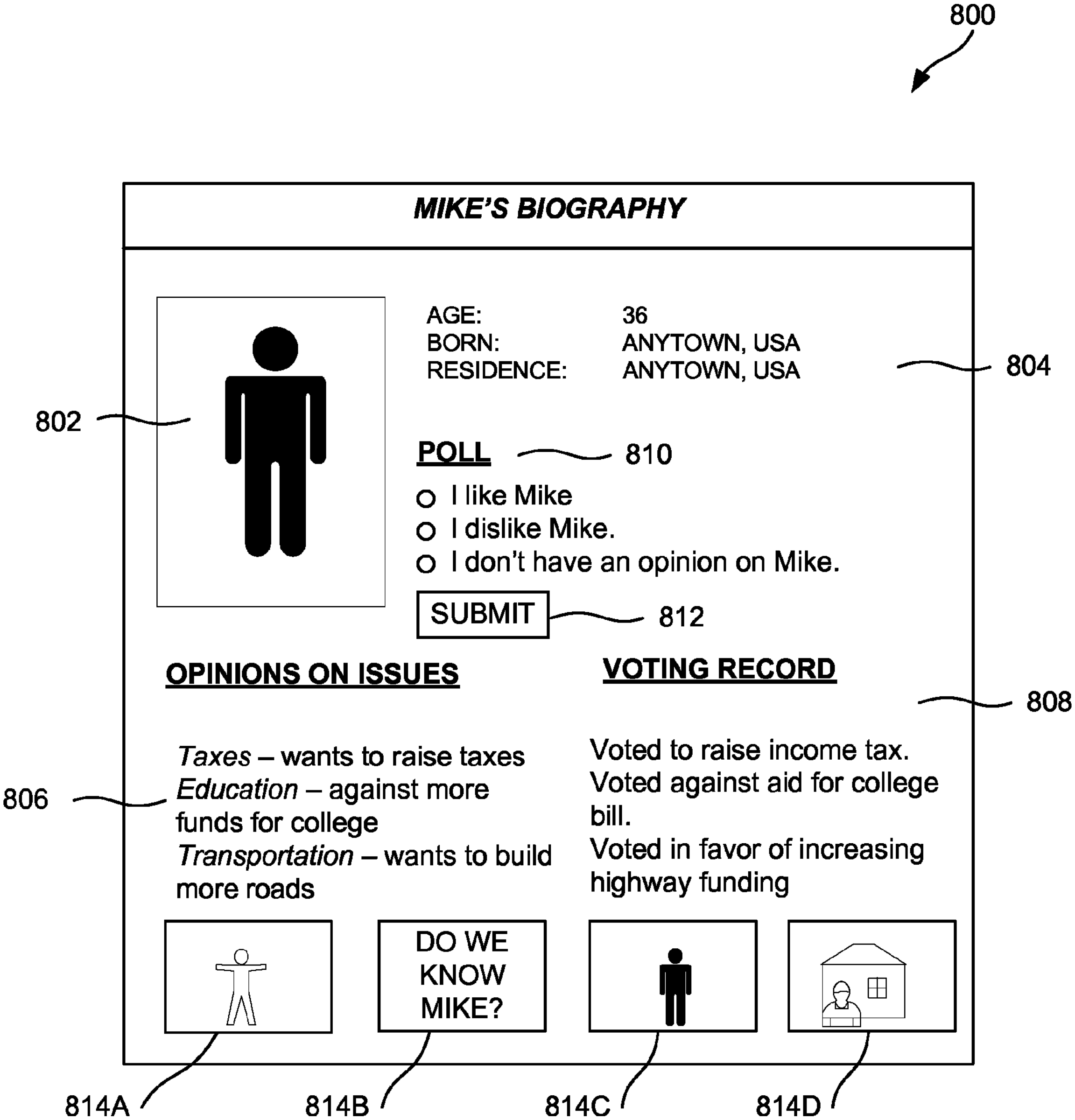
FIG. 8 illustrates a screen shot of another presentation window provided by an application server.

For example, computer user 112 may select to view a candidate biography 704 of Mike by activating a corresponding link on presentation window 700. Computer user 112 is then presented with another presentation window 800 (see FIG. 8) comprising a biography of Mike, a candidate for the U.S. Senate. Presentation window 800 includes a photograph of 802 of Mike, biographical data 804 regarding Mike and his opinion 806 on various issues. Since Mike in an incumbent candidate, presentation window 800 may also include his voting record 808 as a member of the U.S. Senate. Computer user 112 is also provided with a poll 810, asking computer user 112 whether they like Mike, dislike Mike, or have no opinion of Mike. It is also to be appreciated that other types of polling questions and formats may be utilized in place of those presented herein.

If computer user 112 desires to participate in poll 810, then computer user 112 can select a desired choice from the poll and press submit button 812. The selection by computer user 112 of poll 810 is transmitted to application server 102 (see FIG. 1) for tabulation with poll choices of other poll participants, such as television user 104 (see FIG. 1) and/or mobile user 108. Responsive to receiving the poll choice of computer user 112A, application server 102 may provide computer 114A with real-time or delayed poll results, which are presented to computer user 112A. For example, poll 810 may be modified to display poll results responsive to application server 102 receiving polling data from computer user 112. A similar polling process may be utilized on mobile communication device 110 or television 106.

Presentation window 800 also includes a preview 814A-814D of one or selectable videos relating to Mike. For example, previews 814A-814D may be user generated videos of voters speaking about Mike, or issues relating to Mike's campaign. These videos may be received from end-users as part of the speak-your mind functionality of presentation window 700, which is described in further detail below. Previews 814A-814D may also be media content relating to Mike's campaign. A preview 814A-814D may be selected to initiate playback of the corresponding user generated video on computer 114. Similar functionality may also be provided on television 106 and/or mobile communication device 110.

In one embodiment, computer user 112 may participate in the speak your-mind 706 (see FIG. 7) feature by uploading a video of computer user 112 (or other individuals) discussing candidates or issues surrounding the election. Application server 102 (see FIG. 1) receives the uploaded video from computer 114, and provides the video as part of the content presented by the web server to other end-users. Thus, the uploaded video may be available for viewing by another computer user using a computer, and may also be made available for presentation on other communication devices, such as television 106 and/or mobile communication device 110.

The number of user generated videos that may presented to some types communication devices may be limited by bandwidth, presentation capabilities or other factors. Thus, the user generated videos or other content presented on some communication devices may include a selected subset of the overall amount of content available for presentation. For example, the user generated videos presented to television user 104 may comprise the highest rated videos of the week as selected based on voting by a plurality of computer users visiting a web site. In one embodiment, application server 102 provides a plurality of computer users with a list of videos available for viewing. Additionally, the plurality of computer users are provided with the ability to vote for their favorite video of the week. Application server 102 receives the favorite video polling data from the plurality of computer users, and tabulates the polling data to generate poll results. Application server 102 may also provide computer users with the ability to rate a video on a numerical scale (e.g., 1 to 10). The ratings received from each computer user on a video by video or other basis may be averaged. As described below, application server 102 may utilize the received polling or rating data and/or totals, averages or other metrics based thereon to determine which videos to present to a user of a communication device. For example, the highest rated videos (based on a selected metric) may be utilized for presentation on other communication devices, such as television 104 and/or mobile communication device 110. In one embodiment, the highest rated videos may be combined into a compilation video presented on a selected channel of television distribution network 116 (see FIG. 1). It will also be appreciated that other factors may be utilized to select videos for display to television user 104, or end users of other communication devices.

Figure 9:
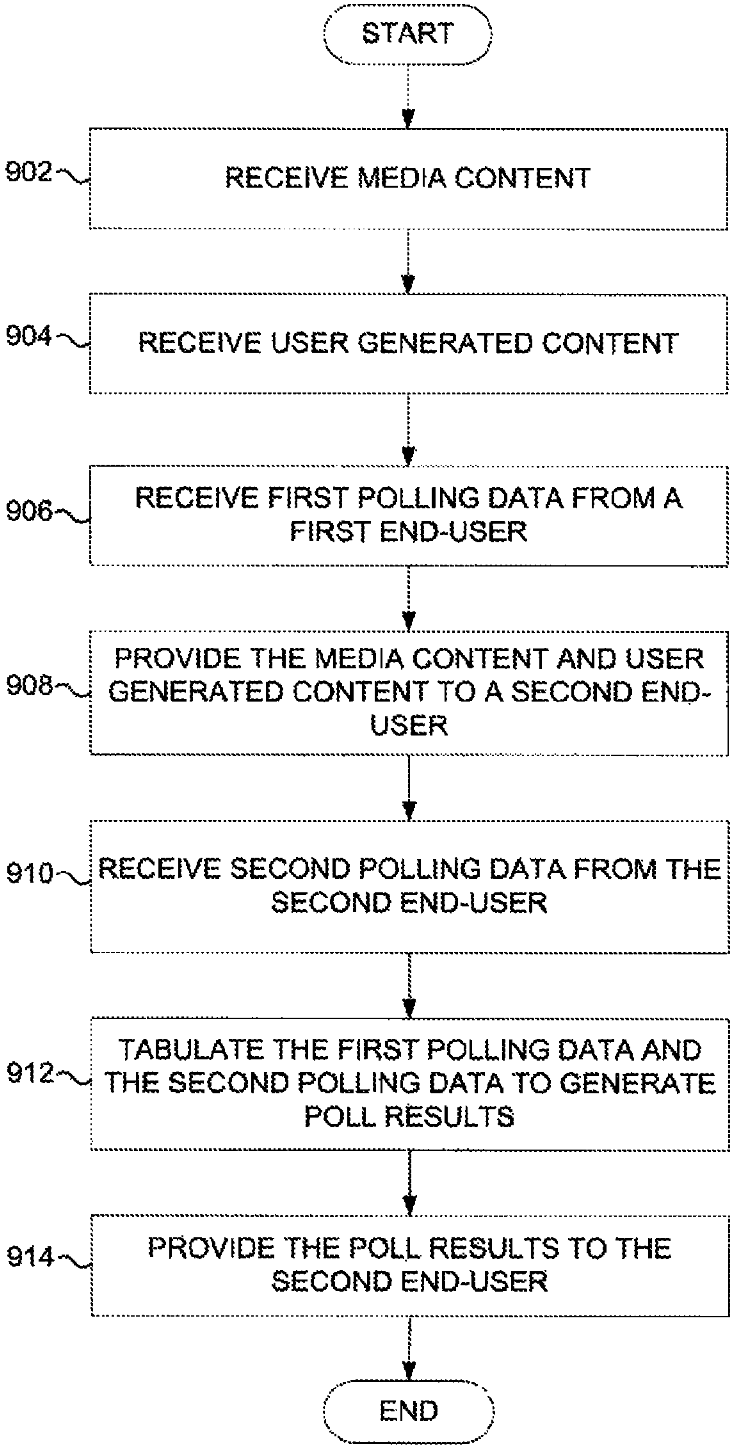
FIG. 9 illustrates an embodiment of a process for providing content to disparate communication devices.

FIG. 9 illustrates one embodiment of a process for providing content to disparate communication devices. The operations of the process of FIG. 9 are not all-inclusive, and may comprise other operations not illustrated for the sake of brevity.

The process includes receiving media content, relating to a subject (e.g., the election), from at least one media producer (operation 902). The subject may be identified by one or more media producers (e.g., a satellite television provider). For example, a satellite television provider may identify the subject as the election, and may further identify categories relating to the subject (e.g., particular candidates in the election). Thus, the media content may comprise biographies relating to one or more candidates in the election.

The process further includes receiving user generated content, relating to the election (operation 904). The user generated content is received from one or more users of the disparate communication devices. The user generated content may comprise a user generated video, a message forum posting, a blog entry, an article submission, and/or other information or content.

The process further includes receiving first polling rate, relating to a subject (e.g., the election), from a first end-user of a first communication device (operation 906). For example, the first-end user may provide the first polling data via a computer or mobile communication device. The first end-user may be the same as or different than the user providing the user generated content during operation 904.

The process further includes providing the media content and the user generated content, for presentation, to a second end-user of a second communication device (operation 908). The second communication device may be disparate from the first communication device. For example, the second end-user may view the media content and the user generated content on a television, whereas the first communication device may be a computer or mobile communication device.

During operation 908, the second end-user may be presented with a poll relating to the election. The process further includes receiving second polling data from the second end-user (operation 910). The second end-user may provide the polling data using the second communication device, or another communication device. For example, the second end-user may provide the polling data using a television remote control.

It is also to be appreciated that a television or associated set-top box may be unable to communicate polling data back to a server collecting the polling data. In other situations, it may be inconvenient for a person to vote utilizing the set-top box or remote control. In these situations, the second end-user may be prompted to utilize a mobile communication device (or other communication device) to participate in the poll that is different from the communication device upon which they viewed the poll. For example, the second end-user may participate by sending a text message to a specific telephone number displayed on a television, or by calling a specified telephone number and voting using a touch tone telephone.

The process further includes tabulating the first polling data and the second polling data to generate polling results (operation 912). Thus, the poll results represent opinions provided by users of disparate communication devices. In one embodiment, the polling results may also be tabulated based on polling data from a third disparate communication device. For example, the polling results may be generated based on polling data from computer end-users, television end-users and mobile communication device end-users.

The process further includes providing the poll results for presentation on the second communication device (operation 914). Operation 914 may provide the poll results in real-time once the second end-user provides the polling data, or may provide the poll results to the second end-user at a later time. For example, the poll results may be presented to the second end-user on the television at a specified time once the poll closes. The polling results may also be presented to the second end-user on their on mobile communication device responsive to application server receiving a text message from the second communication device. In one embodiment, a server receiving the polling data may be configured to identify a phone number of a mobile communication device which transmitted the text message, and correlate the phone number to a corresponding set-top box of the second end-user. Responsive to identifying the set-top box, the server may provide the set-top box with poll results for presentation to the second end-user on their television. The tabulated poll results may further be provided for presentation to other end-users of other communication devices, such as a mobile communication device, other televisions, or a computer.

Figure 10:
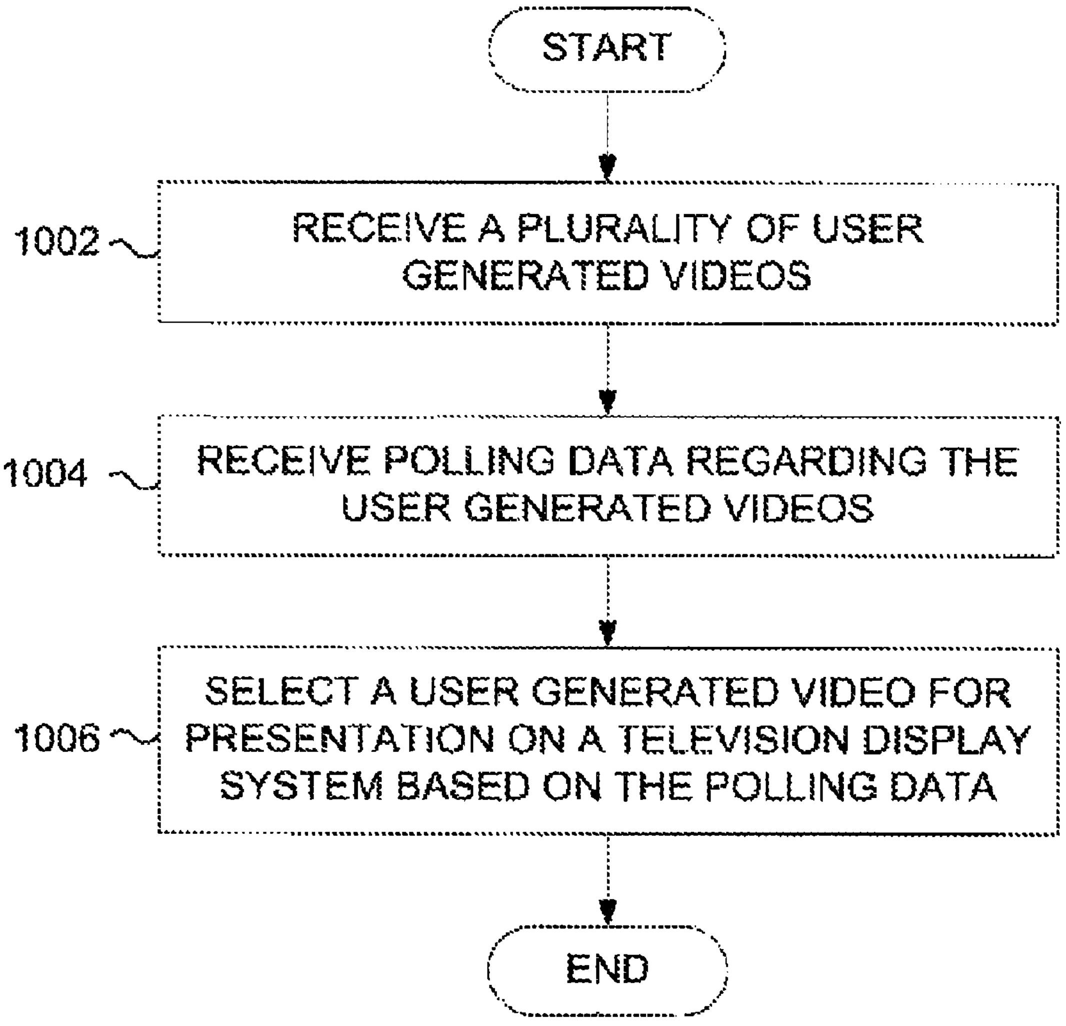
FIG. 10 illustrates an embodiment of a process for determining user generated videos to present on a communication device.

As described above, the user generated videos displayed on a television (or other communication device) may be determined based on voting provided by a plurality of computer users. FIG. 10 illustrates an embodiment of a process for selecting user generated videos to present on a communication device. The operations of the process of FIG. 10 are not all-inclusive, and may comprise other operations not illustrated for the sake of brevity.

The process includes receiving a plurality of user generated videos, relating to a subject (e.g., an election) from a communication device (e.g., a computer) (operation 1002). For example, a web server may receive uploaded videos from a plurality of computer users. The uploaded videos are then presented to visitors of the web server for download and viewing.

The process further includes receiving polling data, from a plurality of end users of communication devices, relating to the plurality of user generated videos (operation 1004). For example, computer end-users viewing user generated videos may provide a numerical relating after viewing the videos.

The process further includes selecting at least one user generated video, for presentation on a communication device (e.g., a television), based on the polling data collected during operation 1004 (operation 1006). The selected videos are then utilized for presentation on a selected communication device. For example, television viewers may be presented with the highest rated videos as selected by computer end-users.

Figure 11:
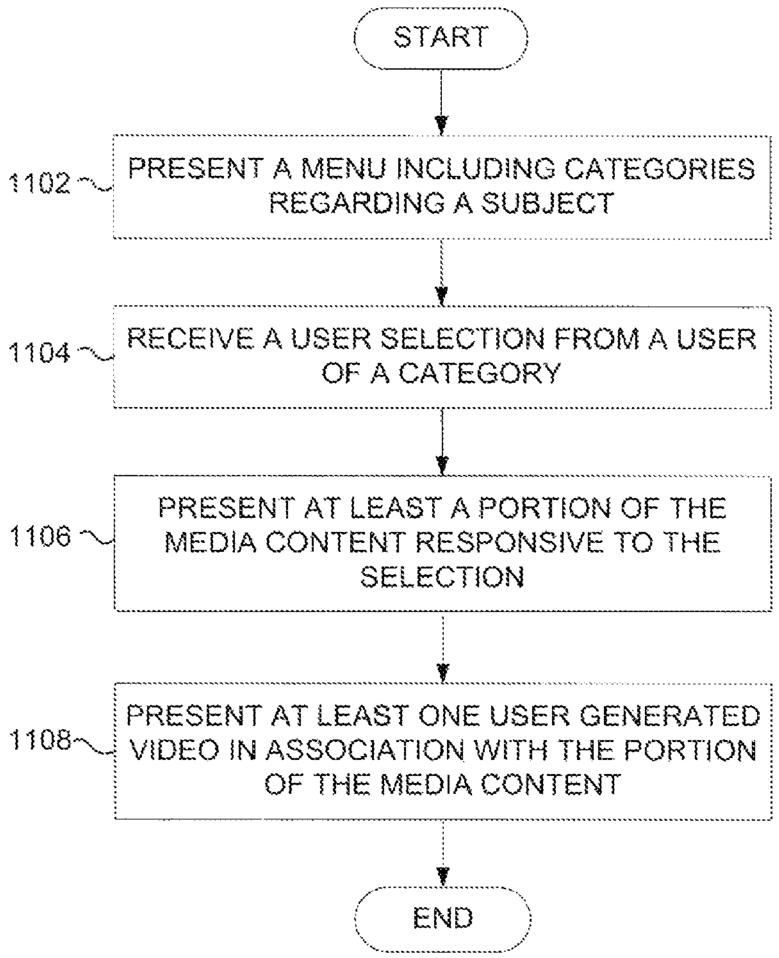
FIG. 11 illustrates an embodiment of a process for providing interactive content to an end-user.

An interactive application on a communication device, such as a set-top box, may be operable to receive election content from a server, and partition the election content and display particular portions of the election content responsive to a request from an end-user. FIG. 11 illustrates an embodiment of a process for providing interactive content to an end-user. The operations of the process of FIG. 11 are not all-inclusive, and may comprise other processes not illustrated for the sake of brevity.

The process includes presenting a menu relating to a subject, including categories regarding a subject. The categories may be arranged based on the media content produced by a media producer. For example, a communication device may receive election news, candidate biographies, information regarding issues, and user generated videos from a server or other source. The communication device may partition the information and videos received to determine appropriate categories for the election content. For example, news information may be partitioned into one category, candidate biographies may be partitioned into multiple categories based on the positions that each candidate is up for election, and relevant issues (e.g., taxes) may be grouped into one or more categories. User generated videos may be grouped with each category of the menu, such that the user generated videos are presented in association with the information for a selected category. It is also to be appreciated that the communication device may be provided with information identifying the categorization of the election content.

Candidate data may also be filtered based on a voting district of a user. Thus, a user may be only presented with candidates that they can vote for in their district. This allows for a broadcast of all candidate data to a communication device (e.g., a set-top box), with the communication device performing filtering of the broadcast candidate data to identify local level data. In a cable television distribution system or other type of communication network, candidate data may be partitioned based on a local distribution network node serving a specific locality. For example, a set-top box may receive candidate data for the voting district corresponding to the local distribution network node.

The process further comprises receiving a user selection from an end-user of at least one category of the menu (operation 1104). For example, a television user may select from the menu to view a candidate biography. The process further includes presenting at least a portion of the media content (e.g., the candidate biography) responsive to the selection (operation 1106). The portion of the media content presented may be determined based on the categorization of the media content in the presented menu.

The process further includes presenting at least one user generated video in association with the portion of the media content (operation 1108). For example, the communication device may present a user generated video, of a voter speaking about the candidate, in association with the candidate biography. The media content and user generated video may be further presented in association with a poll relating to the media content, allowing the user to voice their opinion regarding the election as discussed above.

Once media content, user generated content and/or poll results are received and/or generated, the data may be transmitted in various combinations for presentation on disparate communication devices. The different combinations may be selected for presentation on the communication devices based on user preferences, device capabilities or any other design criteria.

Figure 12:
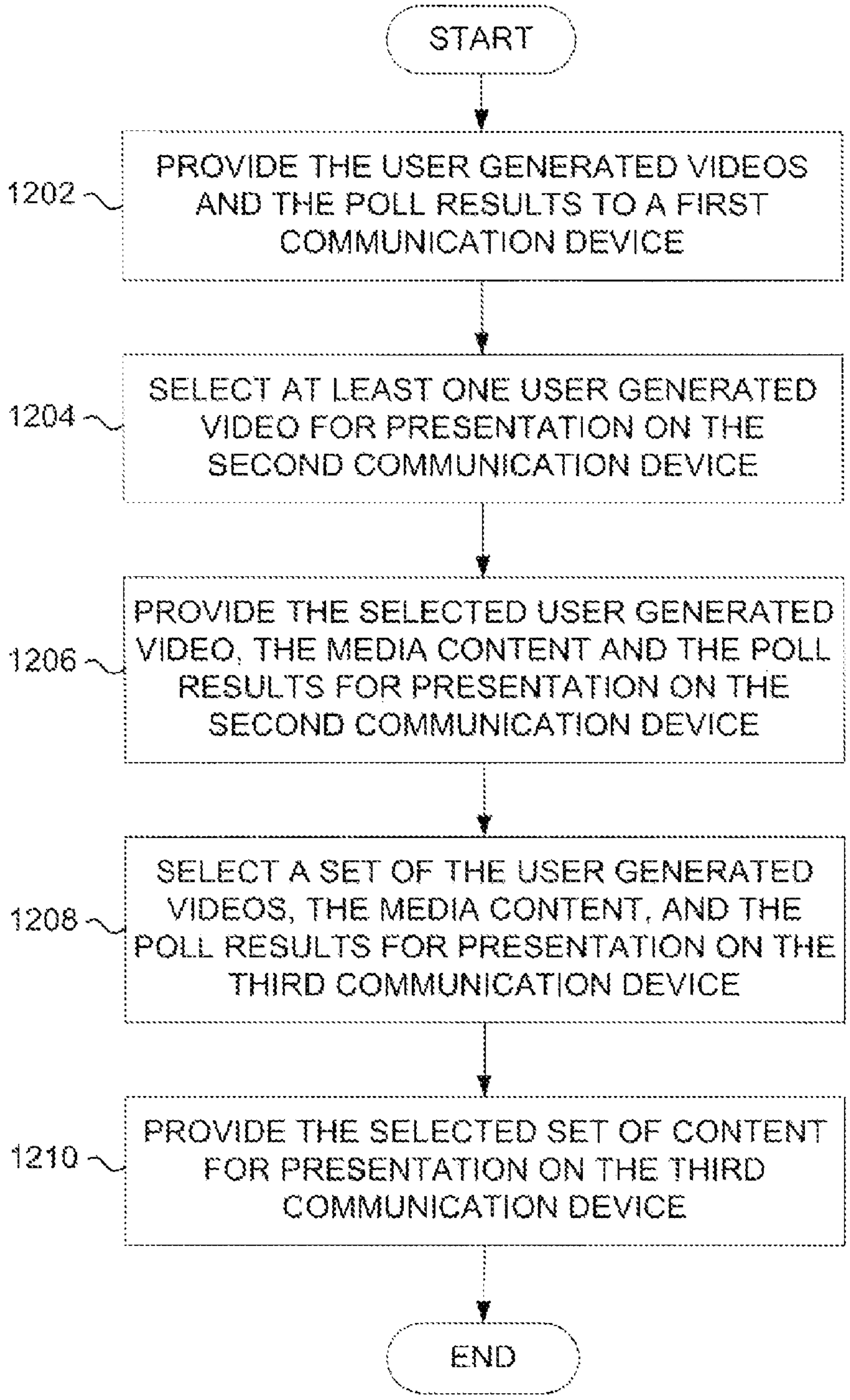
FIG. 12 illustrates an embodiment of a process for providing content to disparate communication devices.

FIG. 12 illustrates an embodiment of a process for providing content to disparate communication devices. The collection of user generated content, media content and polling data is discussed above, and is omitted from the discussion of FIG. 12. The operations of the process of FIG. 12 are not all-inclusive, and may include other steps not illustrated for the sake of brevity.

The process includes providing a plurality of user generated videos and poll results for presentation on a first communication device (operation 1202). For example, a computer end-user may be provided with access to an entire library of user generated videos, and may be provided with poll results tabulated based on polling data provided by the computer end-user. The process may optionally include providing other content, such as candidate videos, in association with the candidate videos.

The process further includes selecting at least one user generated video for presentation on a second communication device (operation 1204). For example, as discussed above, videos may be selected for presentation on a television based on voting by computer end-users. It is to be appreciated that other selection criteria may also be utilized for selecting user generated videos for presentation on the second communication device. Thus, the television end-user may be presented with a subset of the user generated videos presented to computer end-users.

The process further includes providing the user generated video selected during operation 1204, the media content, and poll results for presentation on a second communication device (operation 1206). While the television viewer may be presented with a subset of the user generated videos presented to the computer end-user, they are also presented with media content, which may or may not be provided to the computer end-user, depending on desired design criteria.

The process further includes selecting a set of the plurality of user generated videos, the media content, and the poll results for presentation on the third communication device (operation 1208). The selection process may be performed based on user preferences, network bandwidth capabilities, device presentation capabilities, or any other selected design criteria. The selection process may select none, some or all of the user generated videos for presentation on the third communication device. Likewise, the selection process may select none, some or all of the media content for presentation on the third communication device, and may select whether to present the poll results on the third presentation device.

For example, the third communication device may be a mobile communication device with limited presentation capability. Thus, the mobile communication may be unable to display any type of video data. The selection process may then select to present no user generated videos on the mobile communication device, and may select to present only non-video media content (e.g., text) on the mobile communication device. If the poll results can be presented in text form, then the selection process may also select to present the poll results on the mobile communication device.

The process further comprises providing the set of the plurality of user generated videos, the media content, and the poll results for presentation on the third communication device (operation 1210). Thus, the mobile communication device receives the non-video content selected in operation 1208.

Although specific embodiments were described herein, the scope of the invention is not limited to those specific embodiments. The scope of the invention is defined by the following claims and any equivalents therein.

What is claimed is:

1. An application server comprising:

a polling module, including a processor, which receives polling data, regarding a subject identified by at least one traditional media producer, from two or more end-users of two or more disparate communication devices, and generates poll results based upon the received polling data;

an interface module, including a processor, which receives media content, relating to the subject identified by the at least one traditional media producer, from the at least one traditional media producer, and which receives user generated video content, relating to the subject, from at least one of the two or more end-users from which the polling data was received; and a content module, including a processor, communicatively in signal communication with the polling module and the interface module, comprising a first module that computes poll results based upon the received polling data, and a second module that aggregates and outputs the media content, the user generated video content, and the poll results for simultaneous presentation in a first content format on a first communication device and in a second, disparate content format on a second, disparate communication device, wherein the outputted media content, the user generated video content, and the poll results are communicated to and presented on the first communication device in the first disparate content format and on the second communication device in the second disparate content format;

wherein the interface module receives the user generated video content from a mobile communication device or a computer; the first communication device comprises a television; the second communication device comprises a mobile device; and the content module outputs the received user generated video content, the media content, and the poll results simultaneously in the first content format, which is adapted for presentation on the television, and in the second content format, which is adapted for presentation on a mobile device;

wherein the subject comprises an election and the media content comprises candidate data regarding at least one candidate in the election; and wherein the second communication device further comprises a processing system that is operable to filter the candidate data presented to the user based on a voting district of the user.

2. The application server of claim 1, wherein:

the polling module receives second polling data regarding at least one user generated video, from at least one of the two or more end-users; and the content module selects at least one user generated video based on the second polling data, and outputs the at least one selected user generated video for simultaneous presentation with the media content and the poll results on the first and second disparate communication devices.

* * * * *